US012593210B2

(12) United States Patent     (10) Patent No.:   US 12,593,210 B2
Banerjee et al.     (45) Date of Patent:     Mar. 31, 2026

(54) DYNAMIC SECURITY POLICY GENERATION AND RECOMMENDATION FOR SIM-BASED CLIENTLESS SASE

(71) Applicant: Netskope, Inc., Santa Clara, CA (US)

(72) Inventors: Kallol Banerjee, San Jose, CA (US);
Harsh Pandey, Santa Clara, CA (US);
Bryan D. Black, Norton Shores, MI
(US); Jonathan Bosanac, Ennis, MT
(US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/892,136

(22) Filed: Sep. 20, 2024

(65) Prior Publication Data

US 2026/0089509 A1     Mar. 26, 2026

(51) Int. Cl.
    *H04W 12/088*       (2021.01)
    *H04W 12/122*       (2021.01)
(52) U.S. Cl.
    CPC ....... *H04W 12/088* (2021.01); *H04W 12/122* (2021.01)
(58) Field of Classification Search
    CPC ........................... H04W 12/088; H04W 12/122
    See application file for complete search history.

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |
| 6,622,248 B1 | 9/2003 | Hirai | |
| 7,080,408 B1 | 7/2006 | Pak et al. | |

(Continued)

FOREIGN PATENT DOCUMENTS

EP     1063833 A2    12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Michael W Chao
(74) *Attorney, Agent, or Firm* — MUGHAL GAUDRY & FRANKLIN PC

(57)          ABSTRACT

A dynamic security system to secure cellular devices across a cellular network in a cloud-based environment. The dynamic security system includes a tenant of multiple tenants having multiple cellular devices, a tunnel, a traffic steering module, and a threat management module. The tunnel transmits and identifies traffic associated with different network identifiers. The traffic steering module routes traffic towards gateways and the threat management module analyzes traffic at the tunnel and generates policies and recommendations to remediate a threat. The threat management module intercepts traffic within the tunnel at an application layer of the cloud-based environment, creates policy profiles for tenants, monitors a threat landscape, and relates the threat with the policy profiles. The threat management module further stores tenant profiles, threat information, and policy profiles. Finally, the threat management module generates recommendations based on these profiles and provides recommendations at the cellular device to remediate the threat.

20 Claims, 12 Drawing Sheets

(56) References Cited

U.S. PATENT DOCUMENTS

| | | | |
|---|---|---|---|
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 8,000,329 | B2 | 8/2011 | Fendick et al. |
| 8,069,483 | B1 * | 11/2011 | Matlock ............... H04W 12/122 |
| | | | 726/13 |
| 8,296,178 | B2 | 10/2012 | Hudis et al. |
| 8,464,335 | B1 | 6/2013 | Sinha et al. |
| 8,713,628 | B2 | 4/2014 | Kopti |
| 8,726,338 | B2 | 5/2014 | Narayanaswamy et al. |
| 8,793,151 | B2 | 7/2014 | DelZoppo et al. |
| 8,839,417 | B1 | 9/2014 | Jordan |
| 8,892,766 | B1 | 11/2014 | Wei et al. |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 9,948,606 | B2 | 4/2018 | Shaikh et al. |
| 10,084,825 | B1 | 9/2018 | Xu |
| 10,237,282 | B2 | 3/2019 | Nelson et al. |
| 10,250,624 | B2 * | 4/2019 | Mixer ............... H04L 63/0245 |
| 10,334,442 | B2 | 6/2019 | Vaughn et al. |
| 10,382,468 | B2 | 8/2019 | Dods |
| 10,484,334 | B1 | 11/2019 | Lee et al. |
| 10,587,644 | B1 * | 3/2020 | Stolte ............... H04L 63/1433 |
| 10,616,072 | B1 * | 4/2020 | Lo ............... H04L 41/22 |
| 10,620,241 | B2 * | 4/2020 | Pietrowicz ............... H04L 41/14 |
| 10,749,907 | B2 | 8/2020 | Sinha et al. |
| 10,826,941 | B2 | 11/2020 | Jain et al. |
| 10,834,596 | B2 * | 11/2020 | Choi ............... H04L 63/1425 |
| 10,893,066 | B1 * | 1/2021 | Oliphant ............... H04L 63/1441 |
| 10,938,743 | B1 * | 3/2021 | Andrews ............... H04L 47/822 |
| 10,938,850 | B2 * | 3/2021 | Tamir ............... G06F 21/577 |
| 11,012,475 | B2 | 5/2021 | Patnala et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,316,901 | B1 | 4/2022 | Li et al. |
| 11,323,884 | B2 * | 5/2022 | Lifshitz ............... G06N 20/20 |
| 11,388,175 | B2 | 7/2022 | Pularikkal et al. |
| 11,399,276 | B2 | 7/2022 | Weinberg et al. |
| 11,516,222 | B1 * | 11/2022 | Srinivasan ............... G06F 21/577 |
| 11,743,298 | B1 * | 8/2023 | Badana ............... H04L 63/20 |
| | | | 726/1 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0010497 | A1 * | 1/2006 | O'Brien ............... G06Q 10/10 |
| | | | 726/26 |
| 2006/0156401 | A1 | 7/2006 | Newstadt et al. |
| 2007/0094735 | A1 * | 4/2007 | Cohen ............... H04L 63/168 |
| | | | 713/188 |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0205016 | A1 * | 8/2009 | Milas ............... G06F 21/629 |
| | | | 726/8 |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0216243 | A1 * | 8/2012 | Gill ............... G06F 21/55 |
| | | | 726/1 |
| 2012/0278896 | A1 | 11/2012 | Fang et al. |

| | | | |
|---|---|---|---|
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0237545 | A1 * | 8/2014 | Mylavarapu ........ H04L 63/1441 |
| | | | 726/25 |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0269447 | A1 | 9/2016 | Kailash et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0230402 | A1 * | 8/2017 | Greenspan ............ H04W 12/08 |
| 2017/0250951 | A1 | 8/2017 | Wang et al. |
| 2017/0331859 | A1 | 11/2017 | Bansal et al. |
| 2019/0026094 | A1 * | 1/2019 | Stammers ............... H04L 41/14 |
| 2019/0222612 | A1 | 7/2019 | Nainar et al. |
| 2020/0050686 | A1 | 2/2020 | Kamalapuram et al. |
| 2020/0329055 | A1 * | 10/2020 | Tyagi .................. H04L 63/1441 |
| 2021/0266348 | A1 * | 8/2021 | Manor .................. H04L 43/028 |
| 2022/0019671 | A1 * | 1/2022 | Boone .................. H04L 67/306 |
| 2022/0094600 | A1 * | 3/2022 | Khoo .................. H04L 41/0894 |
| 2022/0131759 | A1 * | 4/2022 | Boon .................. H04L 41/046 |
| 2022/0166755 | A1 | 5/2022 | Moore et al. |
| 2022/0224707 | A1 * | 7/2022 | Kapoor ............... G06F 16/9038 |
| 2022/0269817 | A1 * | 8/2022 | Nalluri ............... H04L 63/1441 |
| 2022/0350634 | A1 * | 11/2022 | Nenov ............... G08B 5/36 |
| 2023/0164191 | A1 | 5/2023 | Williams |
| 2023/0344797 | A1 | 10/2023 | Filatov et al. |
| 2023/0370847 | A1 * | 11/2023 | Kim ............... H04L 63/20 |
| 2024/0031411 | A1 * | 1/2024 | Levari ............... H04L 63/1416 |

OTHER PUBLICATIONS

Huckaby, Jeff "Ending Clear Text Protocols," Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-US/newsroom/press-releases/2016/fortinet-security-fabric-named-2016-crn-network-security-product.

Mccullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

(56) References Cited

OTHER PUBLICATIONS

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F, and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.

Fortinet, FortiGate—3600 User Manual (vol. 1 , Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet,FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al. "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&p. 2000, May 2000, pp. 44-55.

Dean, Tamara, Guide to Telecommunications Technology, Course Technology, 2003, 5 pgs,.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management for Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

* cited by examiner

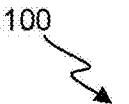
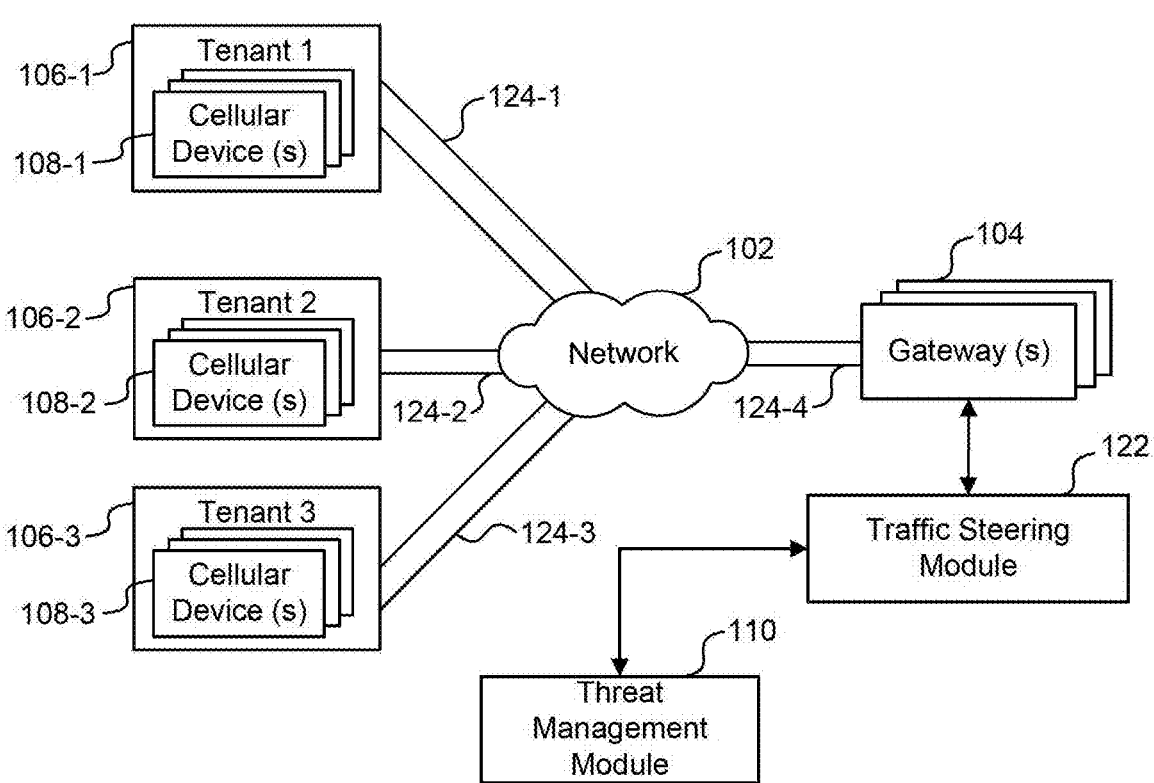
FIG. 1A

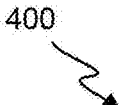
400
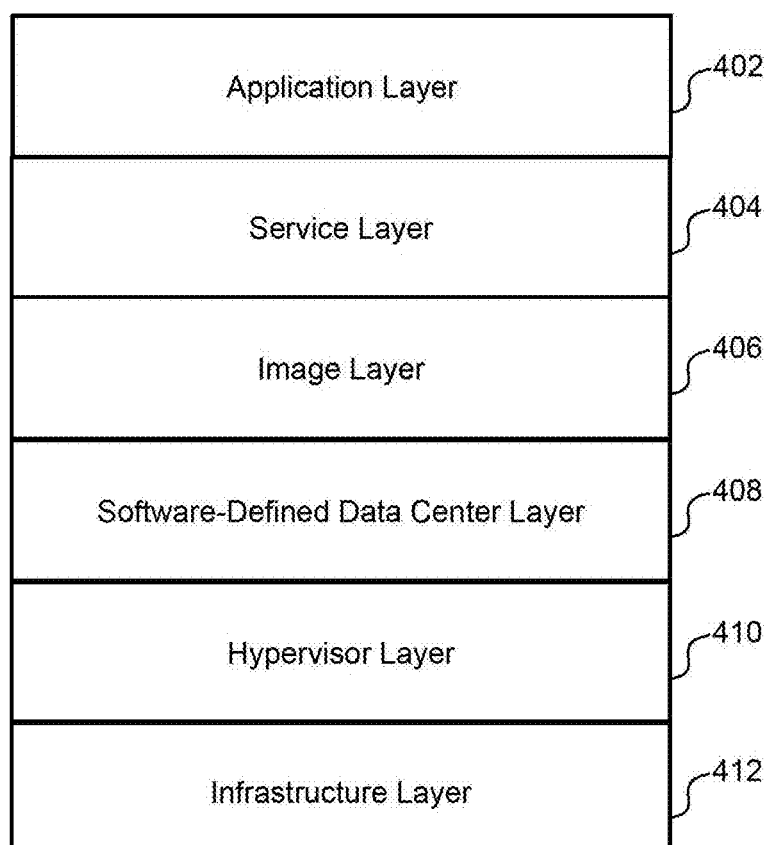
| | |
|---|---|
| Application Layer | ⌐402 |
| Service Layer | ⌐404 |
| Image Layer | ⌐406 |
| Software-Defined Data Center Layer | ⌐408 |
| Hypervisor Layer | ⌐410 |
| Infrastructure Layer | ⌐412 |
FIG. 4

500

502

Access Request
data object xxx
User ID 6479

108

Cellular
Device (s)

110

Threat Management
Module

104

Gateway(s)

Policy

{
For data object xxx;
If
User ID in User_Access.list =[****,..., xxxx]
Authorized access;
Else
Unauthorized access;
}

504

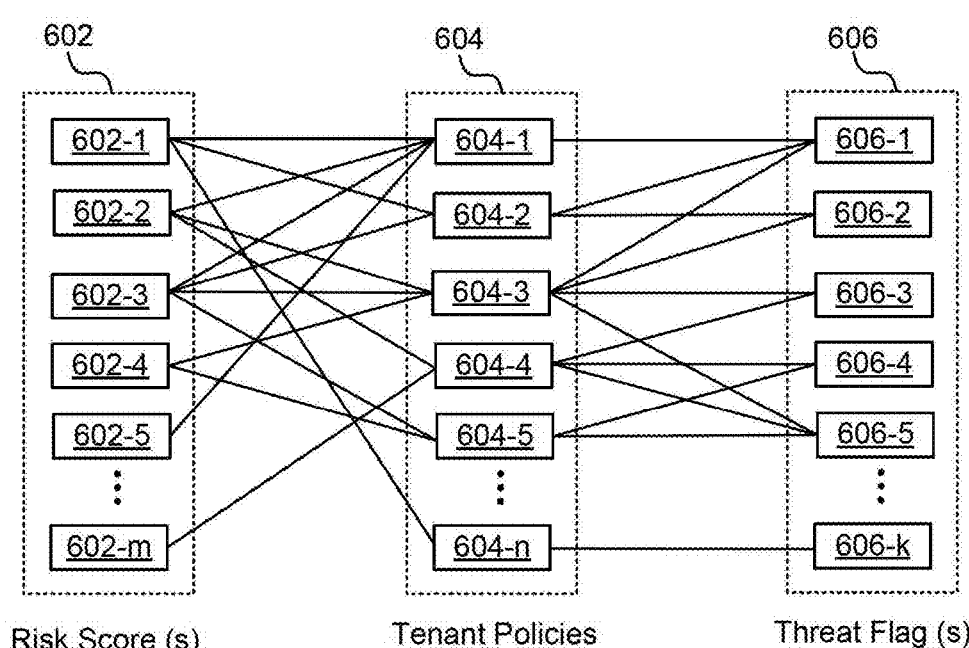
FIG. 6

700

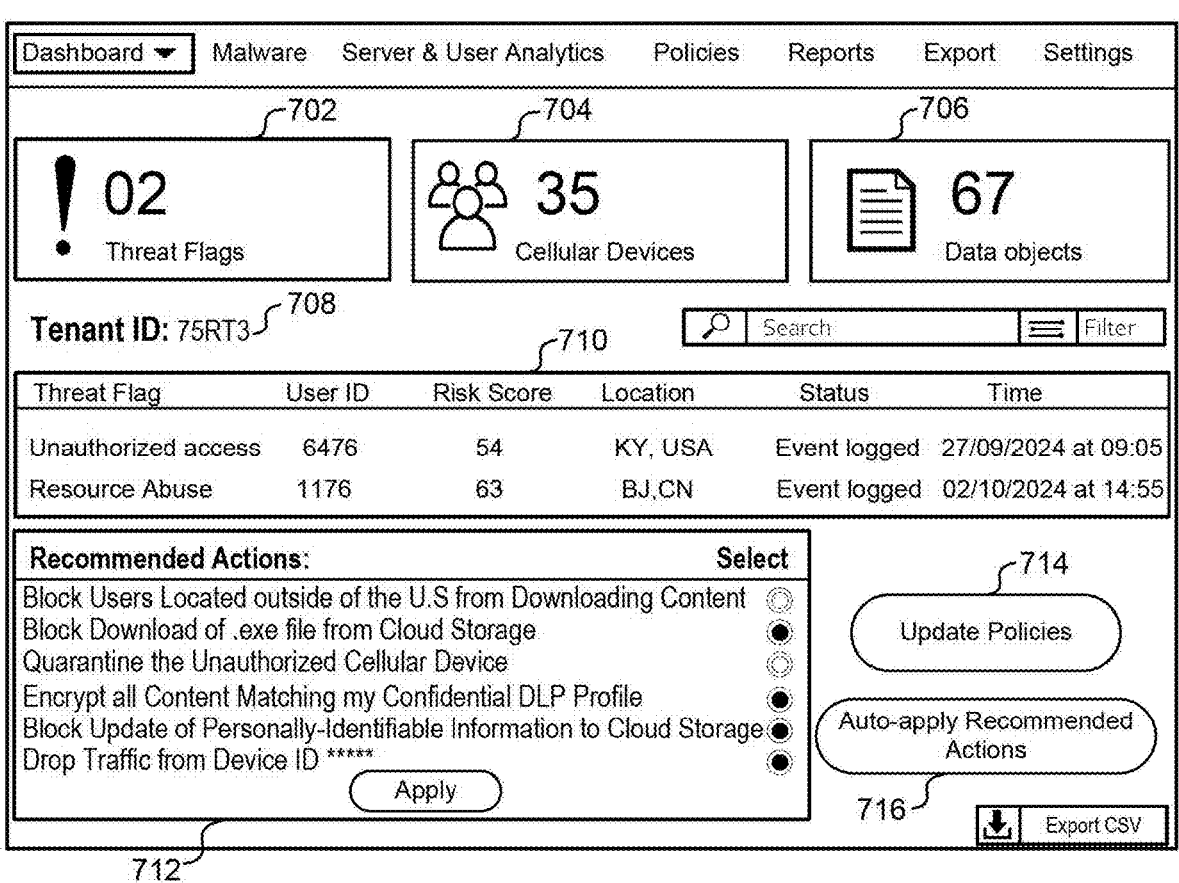

| Dashboard ▼ | Malware | Server & User Analytics | Policies | Reports | Export | Settings |

02 Threat Flags — 702

35 Cellular Devices — 704

67 Data objects — 706

Tenant ID: 75RT3 — 708

710

Search    Filter

| Threat Flag | User ID | Risk Score | Location | Status | Time |
|---|---|---|---|---|---|
| Unauthorized access | 6476 | 54 | KY, USA | Event logged | 27/09/2024 at 09:05 |
| Resource Abuse | 1176 | 63 | BJ,CN | Event logged | 02/10/2024 at 14:55 |

Recommended Actions:      Select

Block Users Located outside of the U.S from Downloading Content ◎
Block Download of .exe file from Cloud Storage ●
Quarantine the Unauthorized Cellular Device ◎
Encrypt all Content Matching my Confidential DLP Profile ●
Block Update of Personally-Identifiable Information to Cloud Storage ●
Drop Traffic from Device ID ***** ●

Apply

714

Update Policies

Auto-apply Recommended Actions

716

⬇ Export CSV

Get Device and Tenant Information ⟶ 902

Create Policy Profiles ⟶ 904

Store Policy Profiles ⟶ 906

Monitor Threat Landscape at Cellular Network ⟶ 908

If Threshold Crossed? ⟶ 910

NO

YES

Generate Policy Recommendations Based on Best Practices ⟶ 912

Get Feedback ⟶ 914

Train the Machine Learning Module ⟶ 916

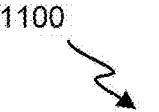
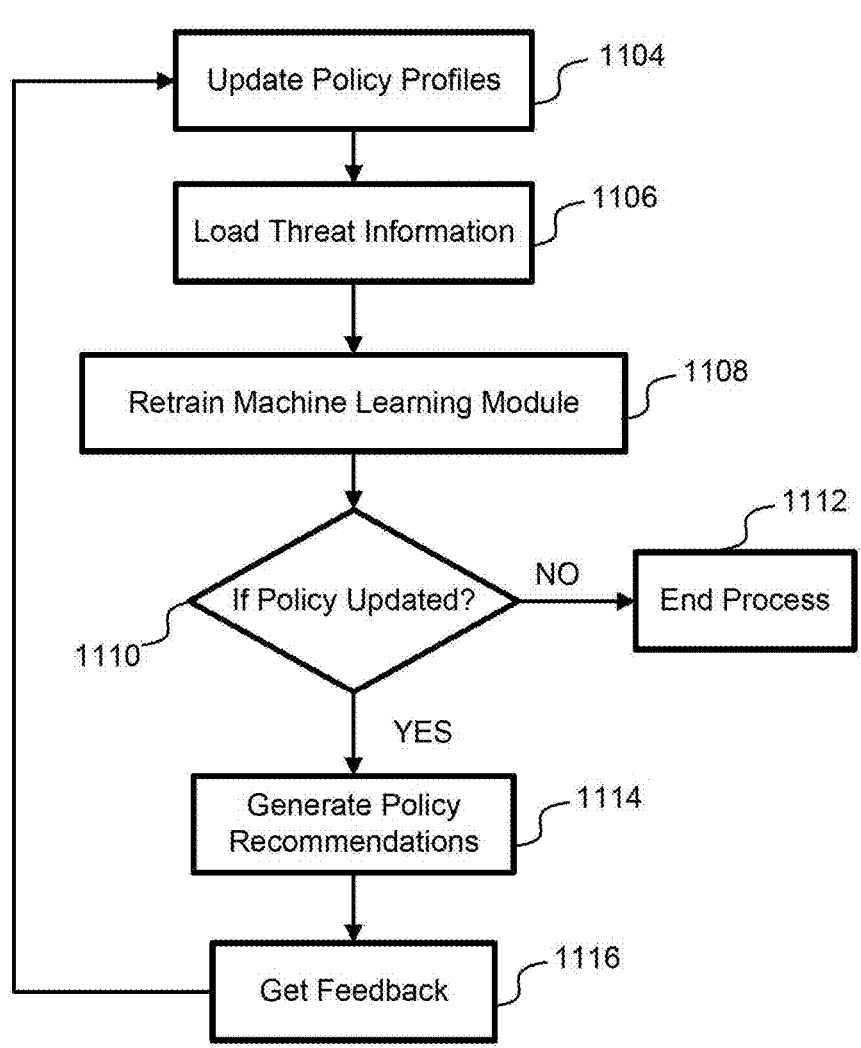
FIG. 11

DYNAMIC SECURITY POLICY
GENERATION AND RECOMMENDATION
FOR SIM-BASED CLIENTLESS SASE

BACKGROUND

This disclosure relates, in general, to internet security and, not by way of limitation, to provide policy recommendations for a global secure architecture for cellular devices, among other things.

Tech support scams and malware are frequently occurring threats in the cybersecurity landscape. Tech support scams involves scammers who deceive individuals into believing their computer systems are compromised and then offer fake services to resolve non-existent problems, often leading to financial loss or unauthorized access to sensitive information. Malware, on the other hand, encompasses various forms of malicious software designed to damage, disrupt, or gain unauthorized access to computer systems. This includes viruses, worms, trojans, and ransomware, each with unique methods of infiltration and damage.

Category-based threats in cybersecurity are a broader classification that includes a range of malicious activities grouped by common methods or objectives. These categories encompass malware, phishing, botnets, distributed denial of service (DDoS) attacks, and others. Each category represents a different approach to compromising security, such as exploiting system vulnerabilities, stealing sensitive data, or disrupting services. Understanding these categories helps in developing targeted defense strategies to protect against the wide array of cyber threats that organizations and individuals face today.

SUMMARY

In one embodiment, the present disclosure provides a dynamic security system to secure cellular devices across a cellular network in a cloud-based environment. The dynamic security system includes a tenant of multiple tenants having multiple cellular devices, a tunnel, a traffic steering module, and a threat management module. The tunnel transmit and identify traffic associated with different network identifiers. The traffic steering module routes traffic towards gateways and the threat management module analyzes traffic at the tunnel and generates policies and recommendations to remediate a threat. The threat management module intercepts traffic within the tunnel at an application layer of the cloud-based environment, creates policy profiles for tenants, monitors a threat landscape, and relates the threat with the policy profiles. The threat management module further stores tenant profiles, threat information, and policy profiles. Finally, the threat management module generates recommendations based on these profiles and provides the recommendations at the cellular device to remediate the threat.

In an embodiment, a dynamic security system to secure cellular devices across a cellular network in a cloud-based environment. The dynamic security system includes a tenant of multiple tenants having multiple cellular devices, multiple tunnels, a traffic steering module, and a threat management module. The tunnels transmit and identify traffic associated with different network identifiers. The traffic steering module routes traffic towards gateways and the threat management module analyzes traffic at the tunnels and generates policies and recommendations to remediate a threat. The threat management module intercepts traffic within the tunnels at an application layer of the cloud-based environment, creates policy profiles for tenants, monitors a threat landscape, and relates the threat with the policy profiles. The threat management module further stores tenant profiles, threat information, and policy profiles. Finally, the threat management module generates recommendations based on these profiles and provides the recommendations at the cellular device to remediate the threat. The recommendations are based on updated policies, the policy profiles, and user preferences. A user selects the recommendations provided by the threat management module at a cellular device.

In an embodiment, a dynamic security method for securing cellular devices across a cellular network in a cloud-based environment. In one step, the dynamic security method includes transmitting and identifying traffic associated with different network identifiers via tunnels. A traffic steering module routes traffic towards gateways and a threat management module analyzes traffic at the tunnels and generates policies and recommendations to remediate a threat. The threat management module intercepts traffic within the tunnels at an application layer of the cloud-based environment, creates policy profiles for tenants, monitors a threat landscape, and relates the threat with the policy profiles. The threat management module further stores tenant profiles, threat information, and policy profiles. Finally, the threat management module generates recommendations based on these profiles and provides the recommendations at the cellular device to remediate the threat. The recommendations are based on updated policies, the policy profiles, and user preferences. A user selects the recommendations provided by the threat management module at a cellular device.

In yet another embodiment, a computer-readable media is discussed having computer-executable instructions embodied thereon that when executed by one or more processors, facilitate a dynamic security method for securing cellular devices across a cellular network in a cloud-based environment. In one step, the dynamic security method includes transmitting and identifying traffic associated with different network identifiers via tunnels. A traffic steering module routes traffic towards gateways and a threat management module analyzes traffic at the tunnels and generates policies and recommendations to remediate a threat. The threat management module intercepts traffic within the tunnels at an application layer of the cloud-based environment, creates policy profiles for tenants, monitors a threat landscape, and relates the threat with the policy profiles. The threat management module further stores tenant profiles, threat information, and policy profiles. Finally, the threat management module generates recommendations based on these profiles and provides the recommendations at the cellular device to remediate the threat. The recommendations are based on updated policies, the policy profiles, and user preferences. A user selects the recommendations provided by the threat management module at a cellular device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 1A-1B illustrates a block diagram of an embodiment of a dynamic security system to secure cellular devices across a cellular network in a cloud-based environment;

FIG. 4 illustrates a block diagram of an embodiment of a cloud open systems interconnection (OSI) model;

FIG. 6 illustrates a mapping between a risk score, a tenant policy, and a threat flag at the threat management module;

FIG. 7 illustrates a graphical user interface (GUI) providing policy recommendations to a user at the cellular device;

FIG. 11 illustrates a flowchart for policy recommendation with a continuous update in policies at the cellular devices of the dynamic security system.

Figure 1B:
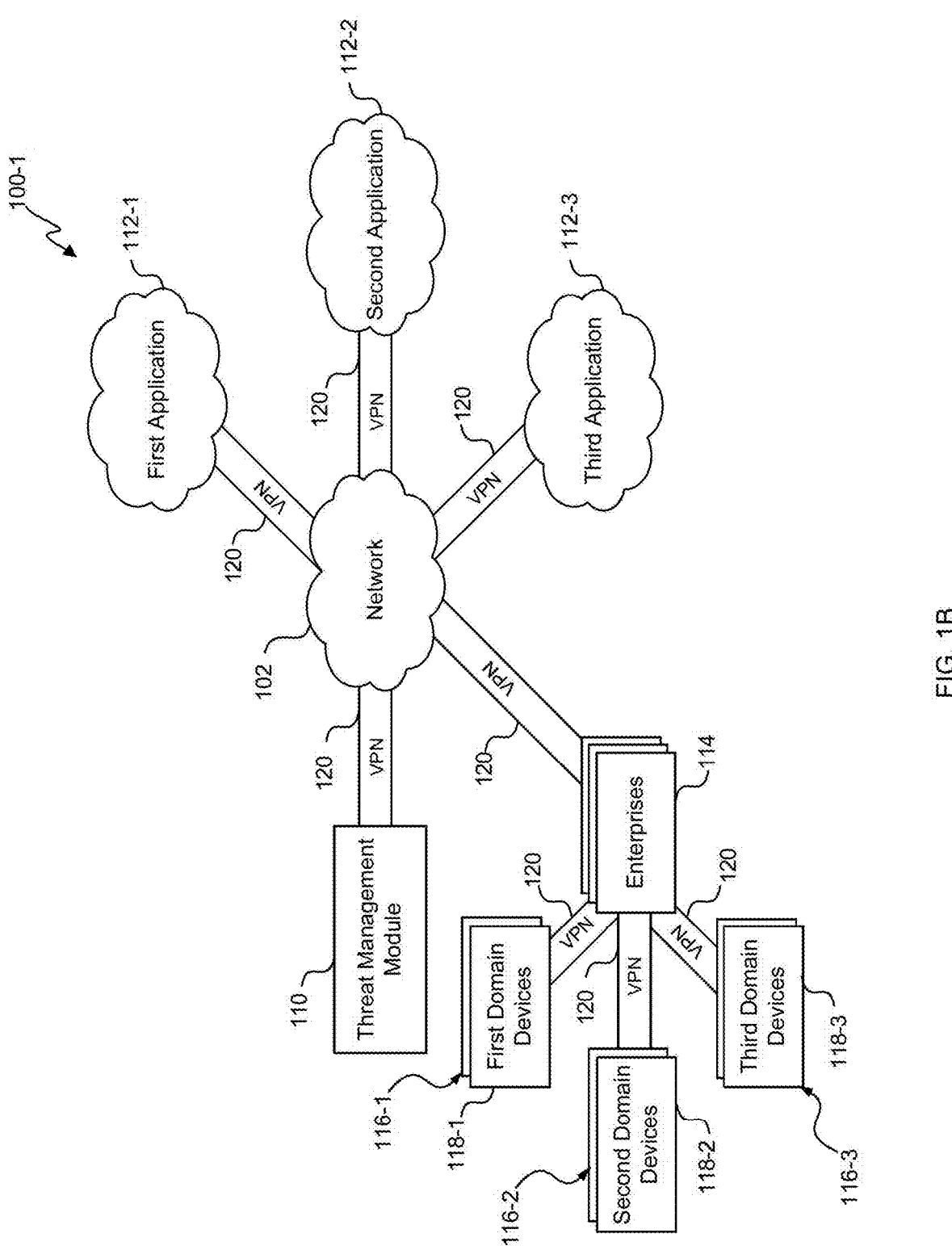

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Referring to FIG. 1A, a block diagram of an embodiment of a dynamic security system 100 to secure cellular devices across a cellular network in a cloud-based environment is shown. The dynamic security system 100 is targeted toward enterprises, service providers, and solution vendors who are deploying and managing large-scale cellular networks. The dynamic security system 100 provides protection to a clientless secure access service edge (SASE) solution that extends enterprise-grade security capabilities to cellular devices while leveraging the existing cellular network infrastructure and subscriber identity module (SIM)/embedded SIM (eSIM)/integrated SIM (iSIM) technologies. By eliminating the requirement for client-side modifications, the dynamic security system 100 enables scalable, efficient, and comprehensive security for a wide range of devices and applications.

The dynamic security system 100 addresses the challenge of securing cellular devices and their communications without relying on client-side software or hardware modifications. The dynamic security system 100 works at an application layer of a cloud open systems interconnection (OSI) model. The dynamic security system 100 provisions SIM of the cellular device 108 with custom network identifiers, analyzes traffic within the tunnels 124, generates and recommends policies, and routes traffic to the destination gateways. As the number of devices connected through cellular networks continues to grow exponentially, ensuring the security of these devices and their data becomes increasingly exigent. Traditional security solutions often require the installation of client software or agents on the devices themselves, which can be impractical or infeasible for many use cases due to resource constraints, proprietary operating systems, or the sheer scale of deployment. The dynamic security system 100 generates and recommends policies not only based on each device's unique features, actions and software architecture but also tenants' industry, geo-location, and best practices for the environment it operates. The policies define the inline security functions and access controls for a user based on the tenant profile and the device identity.

The dynamic security system 100 includes a network 102, gateways 104, tenants 106 (106-1, 106-2, 106-3), cellular devices 108 (108-1, 108-2, 108-3), and tunnels 124 (124-1, 124-2, 124-3, 124-4). The dynamic security system 100 further includes a threat management module 110, and a traffic steering module 122. The network 102 is a cellular network connecting the tenant(s) 106 and transmitting traffic between the cellular devices 108 and the gateways 104. From here on, the terms "cellular network" and "network" will be used interchangeably in this application. The 4G/5G cellular network provides connectivity and data transmission capabilities for the cellular devices 108. The dynamic security system 100 uses the existing mechanism provided by the 4G/5G network to enable device authentication as well as secure traffic steering and segmentation using custom access point names (APNs) for the 4G network or custom data network names (DNNs) for the 5G network. Based on the device identity and APN/DNN configuration, the 4G/5G network creates secure pathways for traffic by segmenting the traffic based on device identity and intended destination in the SASE domain.

The tenant 106 links with multiple cellular devices that access the applications provided on the network 102. The cellular devices 108 are portable electronic devices that use cellular network technology to enable wireless communication. The cellular devices 108 encompass a wide range of gadgets, including smartphones, tablets, and certain types of computers. These devices can transmit data and access the internet. They operate over a network of cells, each served by a base station, allowing for seamless communication even when the user is on the move.

The cellular devices 108 connects to the cellular (4G/5G) network using the SIM which can be a physical SIM, eSIM, or iSIM, which stores the device's network identifiers, policies, and security credentials. Global Secure SIM provided by the dynamic security system 100 for device connectivity is configured with multiple network identifiers i.e. international mobile subscriber identity (IMSIs) which can be managed over the air (OTA) so that the device's data connectivity is not tied to any specific mobile network operator (MNO). From now on in this document, "SIM" will be used as a generic term to represent all different forms like physical SIM, eSIM, and iSIM.

The cellular devices 108 with global secure SIM are configured with custom access point name (APN) for LTE and data network name (DNN) for the 5G network to ensure that the cellular device traffic is segregated and routed through the designated security gateways in the SASE domain for inspection and policy enforcement. In this application, the SIM/eSIM/iSIM enabled IoT devices are referred to as "cellular devices" from hereon.

The tunnels 124 of the dynamic security system 100 are IPsec protected pathways used to secure network communications. This provides a means to establish encrypted connections across public networks. Traffic incoming from different tenants remains separated in the tunnels 124. IPsec is a suite of protocols designed to ensure the confidentiality, integrity, and authenticity of data packets as they travel over the internet or other untrusted networks. It operates by encrypting and encapsulating IP packets, effectively creating a tunnel through which data can pass securely. This is particularly useful for virtual private networks (VPNs), where sensitive information has to be protected from potential interception. Furthermore, the tunnels 124 receive traffic from the cellular device 108 at the cellular network and identifies traffic using network identifiers.

In an embodiment, a single tunnel is used in the dynamic security system 100 to transmit data between the virtual network operators of the cellular device 108 and an enterprise. The use of single tunnel increases the efficacy of the dynamic security system 100. Individual data from the cellular devices 108 is kept isolated within the tunnel and there is no communication between the cellular devices 108 at the cellular to IP packet gateway level.

The gateways 104 in a cellular network serve as the point of interconnection where data is translated and transferred between disparate network protocols. The gateways 104 are responsible for tasks such as authentication, routing, and packet optimization, which are cardinal for the operation of the 3G, 4G, and 5G networks. The gateways 104 ensure that the cellular devices 108 can connect to the core network and that data can flow smoothly and securely from one part of the network to another. The gateways 104 also manage the traffic that enters and exits the network, maintaining the integrity and efficiency of the communication processes within the cellular network infrastructure. The gateways 104 of the dynamic security system 100 receive security policies, device-to-IP mappings, and configuration updates from the SASE management plane and enforce the security policies and access controls defined by the management plane on the device traffic. The gateways 104 further sends real-time telemetry data, logs, and security events to the management plane for analysis and reporting.

The dynamic security system 100 provides security to the cellular devices 108 in both cases; where the cellular devices 108 have a certificate installed or not, for hypertext transfer protocol (HTTP) communication. The certificate is an organization's package installed at the cellular device 108 to provide global secure SIM clientless SASE solution. For the cases where there is no way to install HTTPS trusted certificate, the dynamic security system 100 uses a server name identification (SNI) based URL filtering method to keep the cellular device 108 safe. SNI based URL filtering can also be performed on the traffic at the firewall that utilizes the SNI filed, which is part of the Transport Layer Security (TLS) handshake process, to determine the hostname of the server that the client is attempting to connect to.

The threat management module 110 acts as a man-in-the-middle and intercepts the incoming traffic of the cellular devices 108 at the tunnels 124. The threat management module 110 enforces corresponding policies of a tenant on the traffic of the cellular devices 108 to detect any threat in real-time. The tenant policies are the configurations/set of permissions to curb any threat risks. While the traffic steering module 122 provisions the SIM of the cellular device 108 with network identifiers, the threat management module 110 further generates policies and provides recommendations for cellular device 108 to mitigate threats and enhance security. The threats are the harmful activities or entities that impact the smooth working of the cellular network. For example, malware, phishing, botnets, distributed denial of service (DDoS) attacks, and others.

The traffic steering module 122 is used to route traffic of the cellular devices 108 towards the gateway 104 in the cellular network. The traffic steering module 122 provisions the SIM with network identifiers such as APN in the 4G network and DNN in 5G network. The SIM is configured with a custom network identifier or universal unique mobile subscriber identifier (UUMSI) and a "device-to-IP mapping" is created at the cellular network. The custom network identifiers are used for traffic segregation in the cellular network to provide clientless security. The traffic steering module 122 then distributes the device-to-IP mapping to the gateways 104 in real-time and routes the traffic to the gateways 104 using custom network identifiers.

Referring next to FIG. 1B, a block diagram of an embodiment of a dynamic security system 100-1 is shown. The dynamic security system 100-1 allows multiple tenants in different domains to communicate with applications of various cloud providers over the network 102. The dynamic security system 100 allows multiple tenants/multi-tenant systems or enterprises 114 to use the same network separated by a domain or some other logical separation. Encryption, leased/encrypted tunnels, firewalls, and/or the gateways 104 can keep the data from one enterprise 114 separate from the other enterprise 114. The threat management module 110 intercepts traffic within the tunnels 124 at the application layer of the cloud open systems interconnection (OSI) model. The threat management module 110 provides policy generations and recommendation by analyzing traffic for individual domain data centers.

The dynamic security system 100-1 may include a first computing environment 116-1 having cellular devices for a first domain 118-1, a second computing environment 116-2 having cellular devices for a second domain 118-2, and a third computing environment 116-3 having cellular devices for a third domain 118-3. Individual domain communicates with the enterprise 114 using a virtual private network (VPN) 120 over local area networks (LANs), wide area networks (WANs), and/or the network 102. Instead of the VPN 120 as an end-to-end path, tunneling (e.g., internet protocol in internet protocol (IP-in-IP), generic routing encapsulation (GRE)), policy-based routing (PBR), border gateway protocol (BGP)/interior gateway protocol (IGP) route injection, or proxies could be used.

Enterprises 114, accessing the applications, are connected to the threat management module 110 using the VPN 120 over the network 102. Some examples of the applications include Office 365®, Box™, Zoom™, and Salesforce™ etc. Some or all of applications at the gateways 104 may be different from each other, for example, a first application 112-1 may run Amazon Web Services (AWS)®, a second application 112-2 may run Google Cloud Platform (GCP)®, and the third application 112-3 may run Microsoft Azure®. Although three different applications are shown, any suitable number of applications may be provided that might be strictly captive to a particular enterprise or otherwise not accessible to multiple domains.

Each of the applications may communicate with the network 102 using a secure connection. For example, the first application 112-1 may communicate with the network 102 via the VPN 120, the second application 112-2 may communicate with the network 102 via a different VPN, and the third application 112-3 may communicate with the network 102 via yet another VPN. Some embodiments could use leased connections or physically separated connections to segregate traffic. Although one VPN is shown, many VPNs exist to support different end-user devices, tenants, domains, etc. Enterprises 114 may also communicate with the network 102 and the cellular devices 108 for their domain via VPNs 120. Some examples of the enterprises 114 may include corporations, educational facilities, governmental entities, and private consumers. Each enterprise may support multiple domains to separate its networks logically.

The dynamic security system 100 provisions SIM of the cellular devices 108 with network identifiers, so it has the relevant information, such as, the device identity and to which tenant that cellular device belongs. In this way, the dynamic security system 100 enforces tenant policies to detect threats in real-time traffic. The dynamic security system 100 further generates policies and recommendations to enhance security at a SIM-based clientless SASE solution. The dynamic security system 100 recommends policies based on unique features, activity, and software of the cellular devices 108 and according to the tenant's industry, geo-location, and historical practices for the environment it operates in.

Figure 2:
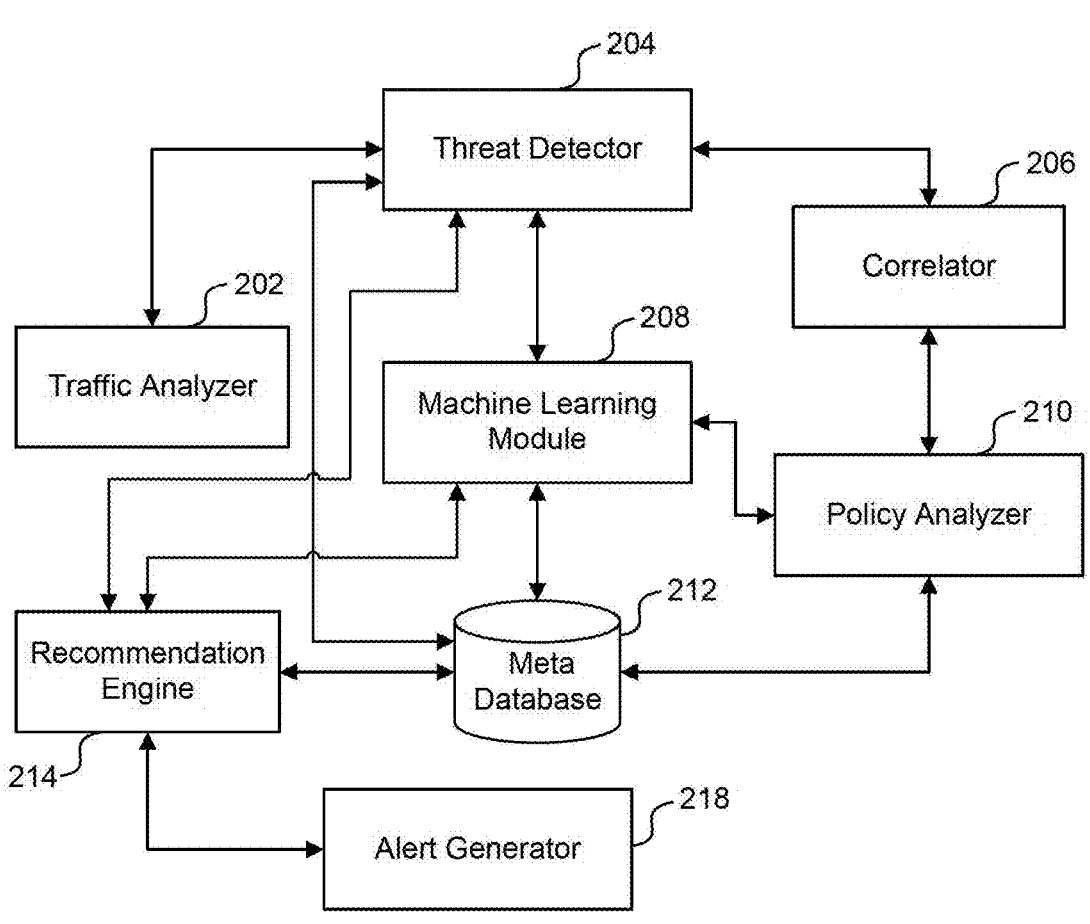
FIG. 2 illustrates a block diagram of an embodiment of a threat management module of the dynamic security system to generate and recommend policies for threat mitigation.

Referring next to FIG. 2, a block diagram of an embodiment of the threat management module 110 of the dynamic security system 100 to generate and recommend policies for threat mitigation is shown. The threat management module 110 acts as a man-in-the-middle and intercepts traffic at the application layer of the cloud OSI model. The threat management module 110 enforces policies, detects malicious entities, and recommends policies based on various factors. Some factors that are considered for policy generation and recommendation include policy profiles, tenant profiles, device details, user details, user activity, geo-location, historical data, etc.

The threat management module 110 includes a traffic analyzer 202, a threat detector 204, a correlator 206, and a policy analyzer 210. The threat management module 110 further includes a machine learning module 208, a meta database 212, a recommendation engine 214, and an alert generator 218. The traffic analyzer 202 monitors the traffic across the cellular network and tries to detect any suspicious activity from the traffic at the tunnels 124. The traffic analyzer 202 interjects the traffic at the tunnels 124 and feeds it into the threat detector 204. The threat detector 204 continuously monitors the threat landscape and billions of policy event alerts on an enterprise's subsystem. The threat detector 204 then associates those alerts with the policy profiles generated by the policy analyzer 210 and thus detects a threat in real-time.

The threat detector 204 enforces policies on the incoming traffic from the traffic analyzer 202 to find any malicious entity at the cellular network. The threat detector 204 provides input on which type of attack is most prevalent at the cellular network at a particular moment. The types of attacks at the cellular network include social engineering attacks, such as phishing or smishing, or network-based threats where attackers exploit unencrypted data on public Wi-Fi networks to conduct unauthorized data interception. The threat detector 204 further provides information on which type of industry is getting hit, which devices and operating systems are at stake or are compromised. The threat detector 204 also determines what kind of services are generating malware at the cellular network. In one embodiment, the alert generator 218 notifies the respective industries or users about the potential risk and impact of the threat.

The correlator 206 acts as an intermediary between the threat detector 204 and the policy analyzer 210. The correlator 206 matches the policy related events or threats identified by the threat detector 204 with the policy profiles generated by the policy analyzer 210. This helps in reducing the risk of getting a false positive. For example, if the threat detector 204 identifies a threat at the cellular network, the correlator 206 checks whether the threat is in-line with the policy profile of that user or tenant. The policy profiles are user-sensitive, so an event might not be a threat for a first user, but it can be a threat for a second user of the same tenant.

The policy analyzer 210 creates policy profiles based on the history of policies that have been configured at the enterprise 114 along with the continuously updated good-practiced policy templates for different features. The policy analyzer 210 matches several conditions for different kinds of policies and tenant profiles to create the policy profiles. The tenant profiles include information about the type of tenant, size of the user base of a tenant, geographic location, and industry of the tenant 106. Policy profiles are further based on different features or conditions such as the presence of threat/malware, data loss prevention (DLP), file constraints, category-based policies, and the destination of a file or application. The policy profiles further consider the user-based policies, the device properties, and the geolocation-based properties associated with the cellular device 108 or the tenant 106.

The file constraints include the information about the file type, size, and identifier (digest, hash, etc.). The category-based policies differ for different URLs and IP addresses. The user-based policies are based on user ID, user groups (AD/system for cross-domain identity management (SCIM) groups, security assertion markup language (SAML) groups, etc.), operating units, and custom active directory (AD) attributes of the user. The device properties include the operating system, browser, user agent, and source IP of the cellular device 108 associated with the user. The geolocation-based policies vary with the location of the user or the cellular device 108, the source country, and the destination country. The policy analyzer 210 uses all these features along with the tenant profiles to create the policy profiles.

The policy analyzer 210 further dictates the remediation actions based on the type and severity of the threat and their related policy profiles. The remediation actions include dropping, bypassing, or allowing the traffic of the cellular device 108. The remediation actions further include blocking the corresponding traffic, quarantining, or allowing limited connectivity to the cellular device 108 based on the policies. In one embodiment, the policy analyzer 210 notifies the tenants 106 or the users about the threat via the alert generator 218. The correlator 206 loads the policy profiles from the policy analyzer 210 and matches it with the suspicious activity to determine a violation of policy. The threat detector 204 takes input from the correlator 206 and assigns scores against every suspicious activity. The risk scores are based on the policies that are violated by the user and represent the risk level or severity of the threat posed by that violation. The risk score is based on the policy feature and the context, based on the tenant profile i.e., geolocation, access methods, operating system, browser used, services or applications accessed by the tenant 106. The risk score for individual policies is not a constant value but depends on the tenant profile. For example, a block policy for social for a financial company has a higher risk score vs a block for a consumer goods company. The first one has much higher weights when calculating the overall policy score because that impacts compliance vs the latter one which is mostly there for risk mitigation but no compliance implications.

Also, it should be mentioned that another feature of implementation for the scores is a Cloud Confidence Index™ (CCI) that assesses a cloud service's enterprise readiness based on objective criteria and assigns an overall score. In particular, the CCI measures the enterprise readiness of cloud services by taking into various attributes of the cloud services. The following list of cloud service attributes is exemplary rather than exhaustive and includes encryption policies, auditability and business continuity, disaster management policies, number of data centers, compliance certifications (e.g. SOC2) of the data centers, identity and access control, file sharing, data classification, audit and alert, data access logs preservation, password policy, forfeiture policies, published data recovery plan, and ability to proxy traffic for inspection and security controls.

Some implementations include assigning a score of 0-100 to each cloud service interfacing with the cellular network at an organization. Further, based on the assigned score, the cloud services are categorized into different cloud confidence levels, such as excellent, high, medium, low, or poor. Other implementations include CCI grouping the cloud services into a plurality of categories, including cloud storage, collaboration, finance and accounting, customer relationship management (CRM), human resources, and software development.

The threat detector 204 calculates the overall policy score of all the policies of the tenant 106 and then compares it with similar tenants. The overall policy score for the tenant 106 indicates the violation of tenant policies, risk score, and threat flags raised at the cellular device 108. If the overall policy score is less, then the recommendation engine 214 comes up with different recommendations by which the score can be improved. Further updates to the recommended policies are based on this overall policy score. In one implementation, CCI can be used as a matching criterion in the real-time content policies, e.g.:

1. Block the upload of personally identifiable information to cloud storage services with a CCI score of "medium" or below.
2. Don't let users share content in cloud storage services rated medium or low or poor. In another implementation, cloud services rated medium or below can be considered non-enterprise-ready and risky.
3. In yet another implementation, organizations can customize CCI by adjusting the index's input weightings to match the organization's requirements and criteria.

Some examples of monitoring and controlling enterprise data using granular policies defined based on the policy profiles include:

1. Allow sales users to share any public collateral while preventing them from downloading content deemed confidential from a cloud storage service to an unmanaged system.
2. Alert IT if any user in investor relations shares content from a finance/accounting service with someone outside of the organization.

3. Blocking any user located outside of the U.S. from downloading contacts from any CRM service.
4. Allow data uploads only to services with a CCI score of medium or above and block uploads to the rest.
5. Encrypting all content matching my confidential DLP profile in cloud services.
6. Blocking the download of any .exe file from a cloud storage service.
7. Alerting on the download of PII from any HR cloud service to the cellular device 108.

One exemplary implementation of the risk scores representing the level of threat posed based on the policy profiles is given in Table I.

TABLE I

| Risk scores and level of threat posed based on policies of a tenant | | | | | |
|---|---|---|---|---|---|
| Policy no. | Policies of Tenant 1 | Action | Policy breached | Risk score | Threat Level |
| 1 | Allow social media | Allow | No | 2 | Low |
| 2 | Prohibited sites | Block | Yes | 7 | High |
| 3 | File protection | Block | No | 0 | None |
| 4 | Restricted countries | Block | No | 7 | High |
| 5 | Unsafe cloud storage | Block | Yes | 8 | High |

Based on the input from the threat detector 204 and the policy analyzer 210, the policy profiles are stored in the meta database 212. The meta database 212 also stores tenant profiles, threat information, scores against each cellular device, and information about user's choice of policies in the past. In one embodiment, the machine learning module 208 takes the scores from the threat detector 204 and policy profiles from the policy analyzer 210 to automatically determine the threat level at the cellular device 108. The machine learning module 208 also assists the recommendation engine 214 for generating the policy recommendations at the cellular device 108. The recommendation engine 214 considers the overall policy score with respect to a tenant profile and recommends policies if the overall policy score is below certain level/safe threshold or not at per with the overall policy score of similar tenant profile. The machine learning module 208 trains itself by looking into the user's choice of policies and incorporates the current feedback from the user. So, when a similar threat comes, the machine learning module 208 looks for the user's previous choices and makes an informed decision to remediate that threat without needing external assistance.

The recommendation engine 214 picks up the policy recommendations based on the policy profiles, tenant and threat information from the meta database 212, and the best practices and user preferences given by the machine learning module 208. The recommendations are based on the tenant profile type, geolocation of origin, cellular device type, user type, destination service type, and geolocation of the destination service. The recommendations are further based on the updated policies at the cellular network and a history of policies that were configured by the tenant in the cloud-based environment. The recommendation engine 214 also generates new policies in real-time based on the type of threat and situation of the user. For example, for a new user, the recommendation engine 214 creates a new policy profile and policies and feeds the policies into the machine learning module 208 to generate recommendations in the future. In one embodiment, the recommendation engine 214 applies the recommended policies at the cellular device 108 when the user is unresponsive to the provided recommendations.

Finally, the alert generator 218 generates a threat flag and notifies the tenant 106 or the enterprise 114 in case of a severe threat at the cellular network. The threat flag is generated for the cases where the score (risk score) of the cellular device 108 crosses a safe threshold/violates one or multiple policies. In another embodiment, the alert generator 218 also notifies the tenant 106 when the user is not selecting any policies or is not allowing the threat management module 110 to apply the policies to remediate the threat.

Notably, different components of the threat management module 110 are operable at a slightly higher level than the actual data plane. The dynamic security system 100 has many data planes and multiple cellular devices of the tenant 106 are sprayed in multiple proxies. In one instance, different tenancies have different meta databases and can make decentralized decisions regarding policy/recommendation generation. As an example, the dynamic security system 100 has the meta database 212, the recommendation engine 214, and the machine learning module 208 at different locations. The components are spread across multiple locations, often across different regions or even different cloud providers. As a result, the dynamic security system 100 gets increased scalability, minimum latency, and lesser security challenges. This makes the dynamic security system 100 distributed in nature and hence, different tenants are catered according to their corresponding proxies.

Figure 3:
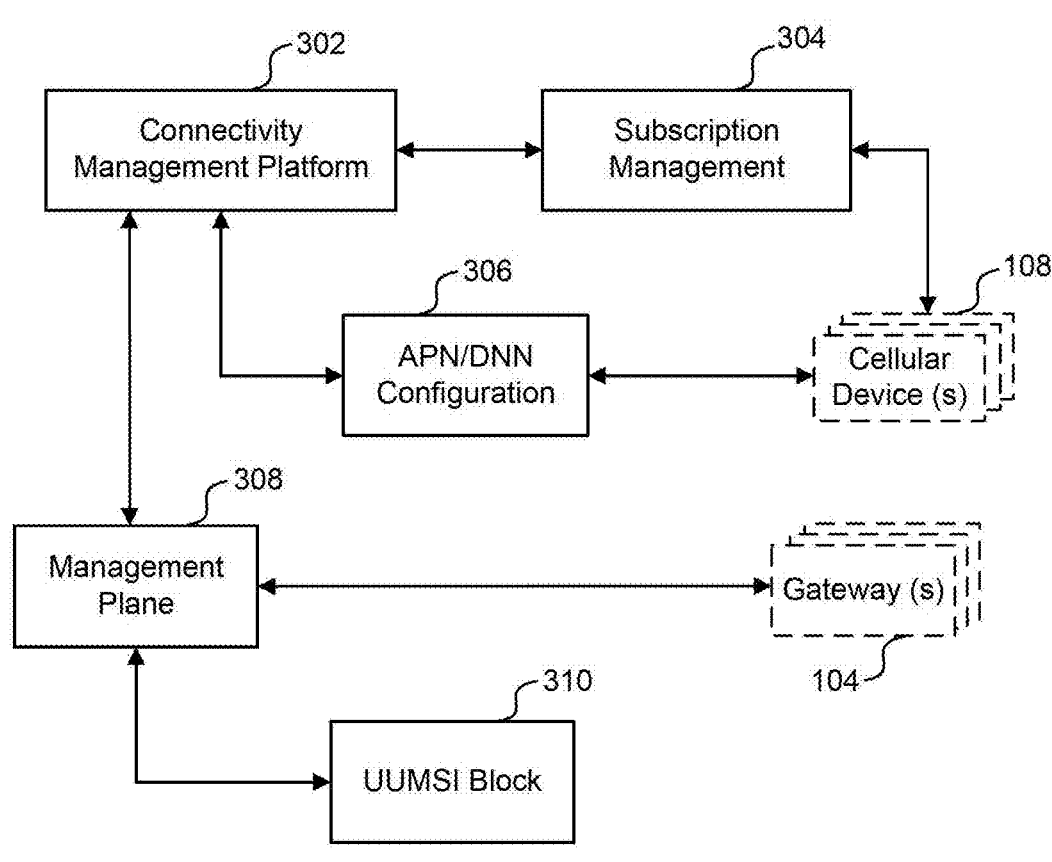
FIG. 3 illustrates a block diagram of a traffic steering module of the dynamic security system to provision SIMs and route traffic of the cellular devices.

Referring next to FIG. 3, a block diagram of the traffic steering module 122 of the dynamic security system 100 is shown. The traffic steering module 122 is used to route traffic towards the secured gateways in the cloud-based environment. The components of the traffic steering module 122 interact seamlessly to provide a multi-layered security approach. The traffic steering module 122 provisions the cellular devices 108 with custom network identifier for providing clientless cellular security while the threat management module 110 analyzes traffic and generates recommendations.

The traffic steering module 122 includes a connectivity management platform 302, a subscription management 304 block, an APN/DNN configuration 306 block, a management plane 308, and a universal unique mobile subscriber identifier (UUMSI) block 310. The connectivity management platform 302 handles the provisioning and lifecycle management of SIM. The connectivity management platform 302 manages the SIM profiles with pertinent network identifiers (IMSIs) over-the-air (OTA), allowing the cellular devices 108 with SIMs to have global connectivity over the 4G/5G network. The connectivity management platform 302 also configures the SIM profile with a custom APN for 4G networks or custom DNN for 5G networks and ensures the cellular device 108 connects to designated cellular network infrastructure using specified custom APN/DNN to enable traffic segregation and secure routing of device traffic through 4G/5G network to designated SASE Gateway.

The connectivity management platform 302 further communicates with Subscription management 304 block in 4G/5G packet core over specific telecom protocol interface (Gx interface) or using REST APIs to request and manage IPv4/IPv6 address assignments for SIM.

The subscription management 304 block maintains the SIM subscription inventory including their associated SIM/eSIM/iSIM profiles, network identifiers, and provisioning status. The subscription management 304 block acts as a policy and configuration management entity with capabilities to configure data usage limits, network access (allow, suspend, restrict), network/location changes, etc. which can be leveraged programmatically to manage a device's connectivity.

The connectivity management platform 302 further provides RESTful API interfaces for seamless integration with the management plane 308 for sharing device provisioning data, IP address assignments, and other relevant information, which enables management plane 308 to retrieve device details and create the device-to-IP mappings. The APN/DNN configuration 306 block assigns custom APNs/DNNs on the SIM/eSIM/iSIM to steer traffic of the cellular devices 108 to the nearest SSE gateway.

The management plane 308 allows for the centralized configuration, monitoring, and enforcement of security policies across a cellular network. This approach simplifies the management of security policies, ensuring that they are consistently applied to all devices, regardless of their location. By leveraging the management plane 308, the tenant(s) 106 can streamline their security operations, reduce the complexity of managing numerous devices, and respond more swiftly to security threats. The management plane 308 enhances visibility and control over the network, enabling administrators to implement and adjust policies with ease and precision.

The management plane 308 retrieves device and subscription details from the connectivity management platform 302 for creating a UUMSI for individual cellular device based on the retrieved information. The management plane 308 establishes and maintains a mapping between the UUMSI and the device's assigned IP address using the "device-to-IP mapping". The UUMSI addresses the limitations of traditional identifiers and provides a secure, scalable, and interoperable solution for device identification and access control in a client-less SASE environment. By leveraging UUMSI, the dynamic security system 100 can effectively manage and secure the cellular devices 108, enforce granular security policies, and enhance the overall security posture of cellular deployments. The management plane 308 also helps in defining and managing security policies for the cellular devices 108 based on their identity, tenant, and application requirements with device level granularity in real-time to adapt to changing security requirements.

The management plane 308 distributes the "device-to-IP" mapping information to the gateways 104 that are related to the traffic in real-time and coordinates with connectivity management platform 302 for intelligent traffic steering to route device traffic to highly suitable SASE gateway based on device location, network conditions, and security requirements to influence routing decisions from the 4G/5G network to the gateway 104 for in-line security. The management plane 308 further identifies the gateways 104 which can be leveraged for fail-over scenarios to ensure disruption-free service.

The UUMSI block 310 provides a unique identifier for each cellular device, regardless of the specific type of identifier used by the device (e.g., ICCID for SIM, EID for eSIM, or iSIM ID for iSIM). Unlike traditional identifiers like international mobile subscriber identity (IMSI) or international mobile equipment identity (IMEI), which can be subject to spoofing or cloning, UUMSI is designed to be immutable and tamper-resistant. The UUMSI block 310 derives the unique identifier from device-specific identifiers, making it more secure and reliable for device identification and authentication. UUMSI follows a standardized format, typically consisting of a fixed-length string of digits. This standardization allows for interoperability and compatibility across different cellular networks, platforms, and security systems. UUMSI is used to establish a mapping between the cellular device 108 and the corresponding tenant or organization within the SASE domain. This mapping enables granular access control and policy enforcement based on the device's identity and associated tenant. The fixed-length and all-digit format of UUMSI enables efficient storage, indexing, and comparison operations. This facilitates fast and scalable device lookup and policy enforcement, making it suitable for large-scale cellular deployments.

Referring next to FIG. 4, a block diagram of an embodiment of a cloud OSI model 400 is shown. The cloud OSI model 400 for cloud computing environments partitions the flow of data in a communication system into six layers of abstraction. The cloud OSI model 400 for cloud computing environments can include, in order: an application layer 402, a service layer 404, an image layer 406, a software-defined data center layer 408, a hypervisor layer 410, and an infrastructure layer 412. The respective layer serves a class of functionality to the layer above it and is served by the layer below it. Classes of functionality can be realized in software by various communication protocols.

The infrastructure layer 412 can include hardware, such as physical devices in a data center, that provides the foundation for the rest of the layers. The infrastructure layer 412 can transmit and receive unstructured raw data between a device and a physical transmission medium. For example, the infrastructure layer 412 can convert the digital bits into electrical, radio, or optical signals.

The hypervisor layer 410 can perform virtualization, which can permit the physical devices to be divided into virtual machines that can be bin-packed onto physical machines for greater efficiency. The hypervisor layer 410 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 408 can provide resource pooling, usage tracking, and governance on top of the hypervisor layer 410. The software-defined data center layer 408 can enable the creation of virtualization for the Infrastructure-as-Code concept by using representational state transfer (REST) application programming interfaces (APIs). The management of block storage devices can be virtualized, and users can be provided with a self-service API to request and consume those resources which do not entail any knowledge of where the storage is deployed or on what type of device. Various compute nodes can be balanced for storage.

The image layer 406 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 406 can focus on the computing in place of storage and networking. The instances within the cloud computing environments can be provided at the image layer 406.

The service layer 404 can provide middleware, such as functional components that applications use in tiers. In some examples, the middleware components can include databases, load balancers, web servers, message queues, email services, or other notification methods. The middleware components can be defined at the service layer 404 on top of specific images from the image layer 406. Different cloud computing environment providers can have different middleware components. The application layer 402 can interact with software applications that implement a communicating component. The application layer 402 is the layer that is closest to the user. Functions of the application layer 402 can include identifying communication partners, determining resource availability, and synchronizing communications. Applications within the application layer 402 can include custom code that makes use of middleware defined in the service layer 404.

Various features discussed above can be performed at multiple layers of the cloud OSI model 400 for cloud computing environments. For example, translating the general policies into specific policies for different cloud computing environments can be performed at the service layer 404 and the software-defined data center layer 408. Various scripts can be updated across the service layer 404, the image layer 406, and the software-defined data center layer 408. Further, APIs and policies can operate at the software-defined data center layer 408 and the hypervisor layer 410.

Different cloud computing environments can have different service layers, image layers 406, software-defined data center layers 408, hypervisor layers 410, and infrastructure layers 412. Further, respective cloud computing environments can have the application layer 402 that can make calls to the specific policies in the service layer 404 and the software-defined data center layer 408. The application layer 402 can have noticeably the same format and operation for respective different cloud computing environments. Accordingly, developers for the application layer 402 do not have to understand the peculiarities of how respective cloud computing environments operate in the other layers.

Figure 5:
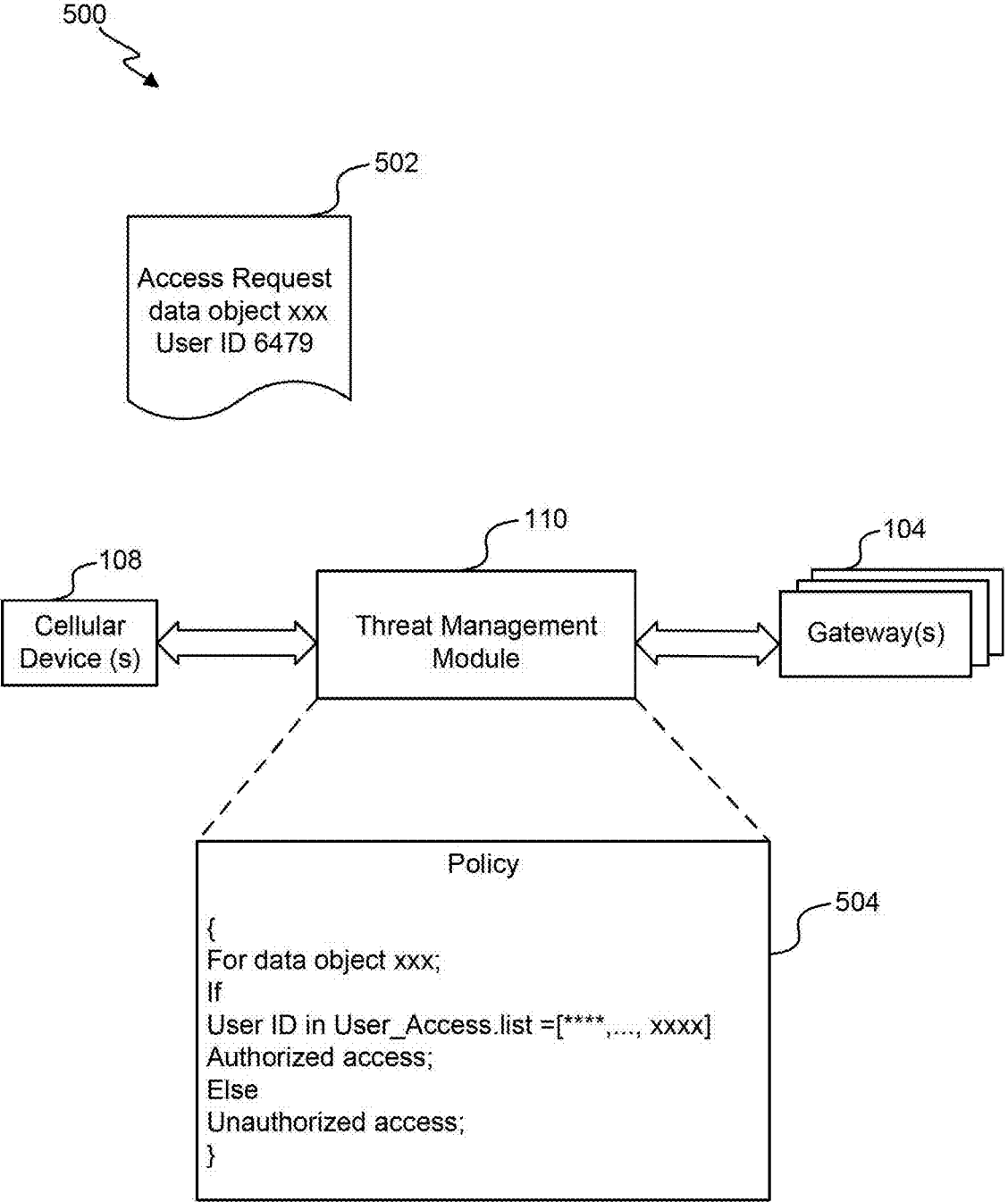
FIG. 5 illustrates a flow diagram of policy enforcement by the threat management module as a man-in-the-middle at an application layer of the cloud-based environment.

Referring next to FIG. 5, a flow diagram 500 of policy enforcement by the threat management module 110 as a man-in-the-middle at the application layer 402 of the cloud-based environment is shown. The threat management module 110 acts as man-in-the-middle and intercepts the incoming traffic of the cellular devices 108 at the tunnels 124. The threat management module 110 enforces corresponding policies of a tenant on the traffic of the cellular devices 108 to detect any threat in real-time. While the traffic steering module 122 provisions the SIM of the cellular device 108 with network identifiers, the threat management module 110 further generates policies and provides recommendations at the cellular device 108 to mitigate threats and enhance security. The flow diagram 500 shows the cellular device 108 attempting to access a data object at the application layer 402. Since the threat management module 110 intercepts the communication between the cellular device 108 and the gateways 104, the access request 502 gets analyzed by the threat management module 110.

The threat management module 110 retrieves the policy governing this interaction from the meta database 212. The policy for accessing the data object xxx 504 has a list of user IDs that are permitted to access this data object. If the user ID 6479 is present in the User_Access.list, the threat management module 110 will authorize this access request and vice versa. If the access is unauthorized, the threat management module 110 assigns a score (risk score) according to the gravity of the case and follows the remediation steps that are also governed by the policies.

Referring next to FIG. 6, a mapping 600 between a score 602 (risk score), a tenant policy 604, and a threat flag 606 at the threat management module 110 is shown. The scores 602(602-1, . . . , 602-*m*) representing the threat or risk of threat associated with the cellular devices 108 and the tenants 106 are regulated by several policies. The update in policies also impacts the scores and the threat flag is generated when the score of the cellular device 108 or the tenant 106 crosses a safe threshold. The threat flag needs immediate attention of the user or the enterprise 114. The risk score of the cellular device 108 is evaluated against multiple policies and the risk score for individual policies is not constant value but depends on the tenant profile. This means that a first enterprise or tenant can have a higher risk score than a second enterprise or tenant, based on the complexity of their operations and other factors Hence, a total score associated with the cellular device 108 is regulated by several policies. The score 602 of the users of the cellular devices 108 is associated with several tenant policies 604 (604-1, . . . , 604-*n*) that defines the roles and rules of the users. The combination of these tenant policies 604 (604-1, . . . , 604-*n*) triggers the threat flags 606 (606-1, . . . , 606-*k*). A single tenant policy 604-*n* also triggers the threat flag 606-*k* which indicates that a policy defines a rule that is to be followed in any case.

Referring next to FIG. 7, a graphical user interface (GUI) 700 providing policy recommendations to a user at the cellular device 108 as an embodiment is shown. The GUI 700 is an exemplary representation that highlights the threat flags 606 raised, and the remediation actions or recommendations provided by the by the threat management module 110. The section 702 at the GUI 700 indicates that there are two threat flags raised by the threat management module 110. In sections 704 and 706, it is indicated that 35 cellular devices and 67 data objects are impacted by the two threat flags, respectively. The data objects are the files, videos, or any type of data present at the cellular network.

At section 708, the tenant ID to which these 35 cellular devices belong is given. The impacted cellular devices may belong to the same or different tenants. The section 710 presents the threat flags 606 along with the user IDs of the cellular devices 108 that triggered the generation of threat flag, risk score, geolocation of the users, status, and time of the policy related event. At section 712, the recommendations or remediation actions are provided at the cellular device 108 based on the policies. The user picks and chooses the recommended actions according to the tenant's or personal preferences. The machine learning module 208 of the threat management module 110 learns from these choices and trains itself based on the user feedback. So, for the next time, the recommendation engine 214 generates policies and recommendations based on the previous preferences of the user and best practices. The list of recommended actions provided at section 712 are sequentially arranged where the top actions are strongly suggested to the user. However, it's up to the user to pick the actions he wants to be implemented.

At section 714, the user can update the policies instead of or in addition to acting on the recommended actions. This, in return, impacts the risk score of the users and a different set of recommendations is generated based on the new policies. At section 716, the user can allow the threat management module 110 to apply the recommended actions on its own. For this purpose, the threat management module 110 uses historical choices and best practices to make an informed decision via the machine learning module 208.

Figure 8:
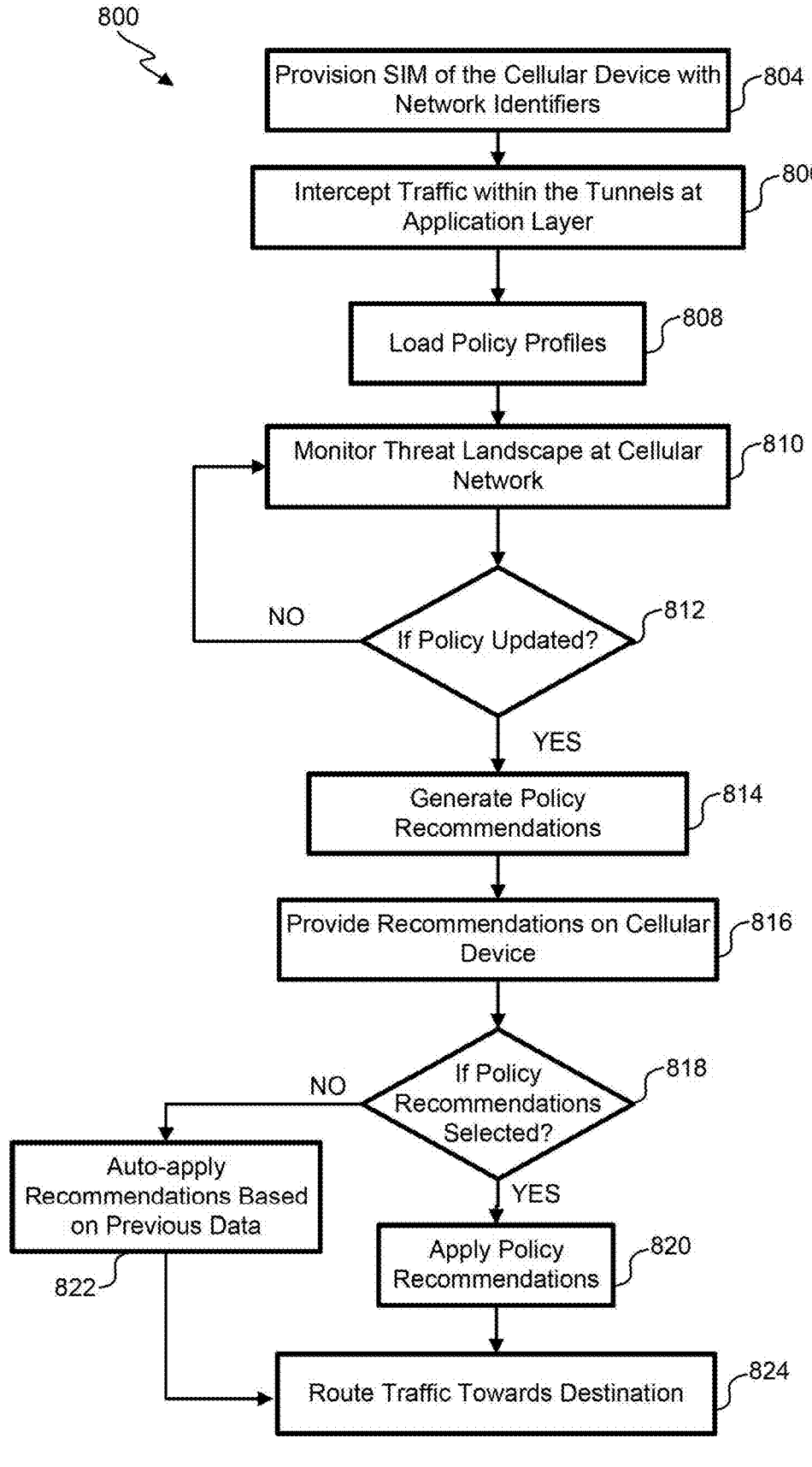
FIG. 8 illustrates a policy generation and recommendation method for threat mitigation at the dynamic security system.

Referring next to FIG. 8, a policy generation and recommendation mechanism 800 for threat mitigation at the dynamic security system 100 is shown. The dynamic security system 100 addresses the challenge of securing cellular devices and their communications without relying on client-side software or hardware modifications. The dynamic security system 100 provisions SIM of the cellular device 108 with custom network identifiers, analyzes traffic within the tunnels 124, generates and recommends policies, and routes traffic to the destination gateways. The dynamic security system 100 generates and recommends policies not only based on each device's unique features, actions, and software architecture but also on tenants' industry, geo-location, and best practices for the environment in which it operates. The policies define the inline security functions and access controls for a user based on the tenant profile and the device identity.

At block 804, the dynamic security system 100 provisions the SIM of the cellular device with custom identifiers. In this way, the dynamic system 100 gets the device and tenant related information automatically by configuring the SIMs. The cellular network then identifies the traffic associated with the custom APN or DNN and routes it to the designated SASE gateway using an intelligent traffic steering mechanism.

At block 806, the threat management module 110 of the dynamic security system 100 intercepts the traffic within the tunnels 124 at the application layer 402 of the cloud network. This indicates working of the threat management module 110 as a man-in-the-middle that analyzes the traffic at the cellular network without interrupting the flow of data. The tunnels 124 of the dynamic security system 100 are IPsec tunnels that are used to secure network communications. This provides a means to establish encrypted connections across public networks. Traffic incoming from different tenants remains separated in the tunnels 124.

In the case where a single tunnel is used for the dynamic security system 100, the traffic from different tenants is isolated regardless of being in the same tunnel. This ensures that there is no cross talk between the tenants 106 in the multi-tenant environment and the tunnel is terminated at the data plane of the enterprise 114.

At block 808, the threat management module 110 loads the policy profiles from the meta database 212 to analyze the traffic. The policy profiles are created by the policy analyzer 210 according to various features, including information about the type of tenant, size of the user base of a tenant, geographic location, and industry of the tenant 106. Policy profiles are further based on different features or conditions, such as, the presence of threat/malware, DLP, file constraints, category-based policies, and the destination of a file or application. The policy profiles further consider the user-based policies, the device properties, and the geolocation-based properties associated with the cellular device 108 or the tenant 106.

At block 810, the threat detector 204 of the threat management module 110 monitors the threat landscape at the cellular network. With continuously updating policies, the threat landscape keeps on changing with billions of policy related event alerts. The threat detector 204 assigns scores to each policy related event/suspicious activity and corresponds these events to their related policies. If a policy or multiple policies get violated, the threat detector 204 flags it as a threat. The user might not have intentionally violated the policy, it may be due to a change in policy from the tenant 106 or the enterprise 114 that the user is unaware of.

At block 812, threat management module 110 checks whether there is an update in the policy for a particular cellular device or tenant. If the policies are not updated, the threat detector 204 keeps on monitoring the threat landscape at the cloud network. On the other hand, if there is a change in the policy, the recommendation engine 214 generates policy recommendations for the cellular device 108 at block 814. The policy recommendations are the remediation actions that are to be implemented at the cellular device 108 to ensure smooth flow of data and network security.

The recommendation engine 214 considers the overall policy score with respect to a tenant profile and recommends policies if the policy score is below certain level or not at per with the overall policy score of similar tenant profile. The overall policy score for the tenant 106 indicates the violation of tenant policies, risk score, and threat flags raised at the cellular device 108. The policy recommendations are generated based on the policy profiles, tenant, and threat information from the meta database 212 and the best practices and user preferences given by the machine learning module 208. The recommendations are based on the tenant profile type, geolocation of origin, cellular device type, user type, destination service type, and geolocation of the destination service. The recommendations are further based on the updated policies at the cellular network and a history of policies that were configured by the tenant in the cloud-based environment. The recommendation engine 214 also generates new policies in real-time based on the type of threat and situation of the user At block 816, the threat management module 110 provides recommendations to the user at the GUI 700 of the cellular device 108. The user picks and chooses the recommended actions according to the tenant's or personal preferences. The machine learning module 208 of the threat management module 110 learns from these choices and trains itself based on the user feedback.

At block 818, the threat management module 110 checks whether the user has selected any policy recommendations or not. If the user has selected the policy recommendations, the threat management module 110 applies those recommendations to remediate or mitigate the threat at the cellular network at block 820. On the other hand, if the user has not made any choice, the threat management module 110 auto-applies the recommended actions, at block 822, based on the user's previous preferences and the best practices for the environment the cellular device 108 is operating in.

Finally, at block 824, the dynamic security system 100 routes the traffic towards the destination gateway using the traffic steering module 122. The traffic steering module 122 provisions the SIM with network identifiers such as APN in the 4G network and DNN in 5G network. The SIM is configured with a custom network identifier or universal unique mobile subscriber identifier (UUMSI) and a "device-to-IP mapping" is created at the cellular network. The traffic steering module 122 then distributes the device-to-IP mapping to the gateways 104 in real-time and routes the traffic to the gateways 104 using custom network identifiers.

Figure 9:
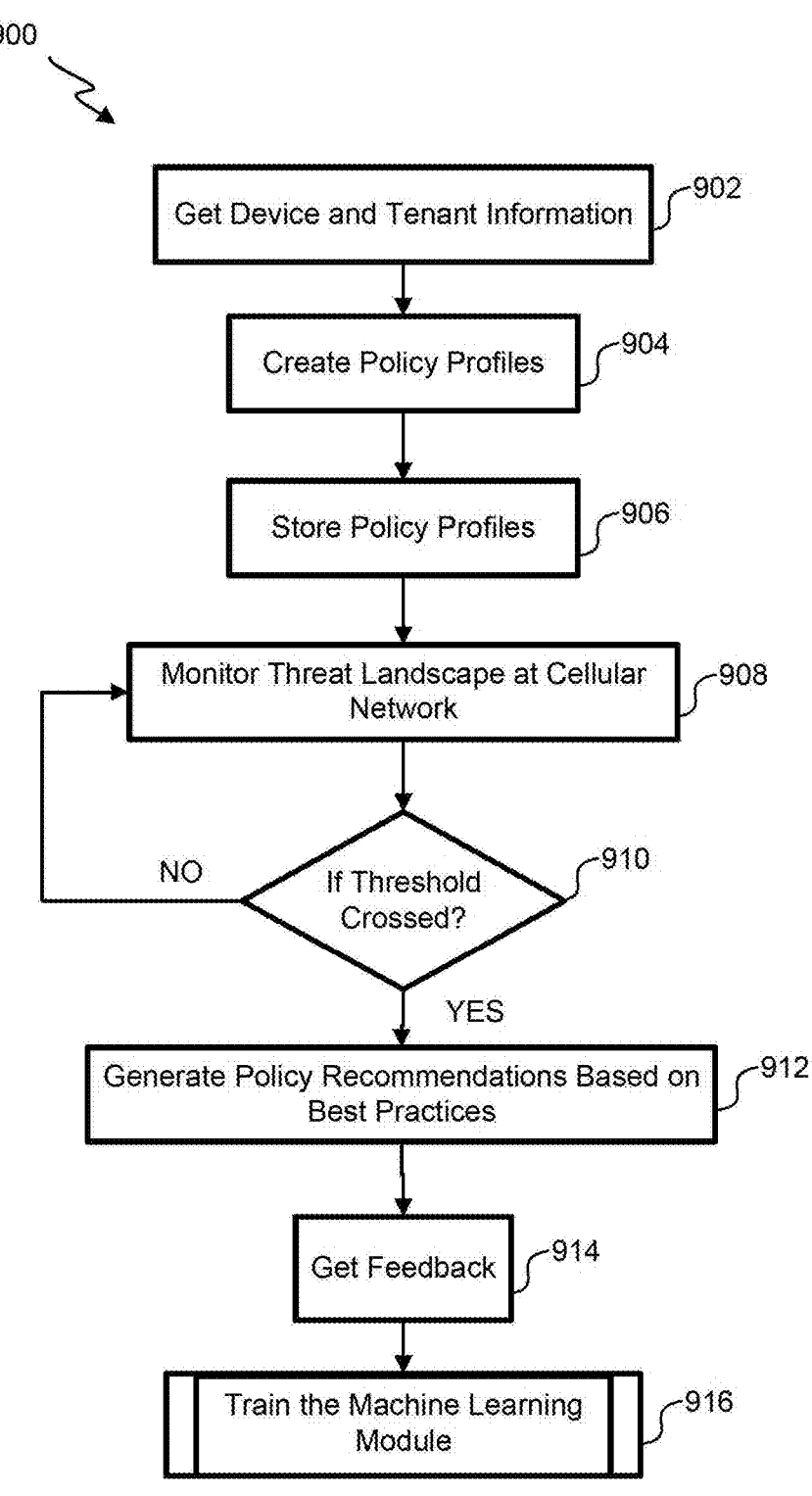
FIG. 9 illustrates a flowchart for a first-time provisioning of the cellular device and policy generation at the dynamic security system as an embodiment.

Referring next to FIG. 9, a flowchart for a first-time provisioning 900 of the cellular device 108 and policy generation at the dynamic security system 100 as an embodiment is shown. For the cellular device 108 that is getting configured for the first time at the cellular network, the dynamic security system 100 provides policy recommendations based on the best practices that are generally used network-wide. At block 902, the dynamic security system 100 gets the information about the cellular device 108 and the related tenant by provisioning the SIM with custom network identifiers. As the SIM is configured by the traffic steering module 122, the dynamic security system 100 automatically gets the device and tenant information needed for creating policy profiles.

At block 904, the policy analyzer 210 creates the policy profile for a new cellular device and stores the policy profile in the meta database 212, at block 906. The policy analyzer 210 creates policy profiles based on the history of policies that have been configured at the enterprise 114 along with the continuously updated good-practiced policy templates for different features. The policy analyzer 210 matches several conditions for different kinds of policies and tenant profiles to create the policy profiles. The tenant profiles include information about the type of tenant, size of the user base of a tenant, geographic location, and industry of the tenant 106.

At block 908, the threat detector 204 analyzes the device activity of a user and monitors the threat landscape across the cellular network. The threat detector 204 detects any threats and correlates it with policy profiles of the user to find any violation of the policies. If the violation of a policy is detected, the threat detector 204 flags this as a threat and raises the threat flag. At block 910, the threat management module 110 checks whether the overall policy score of the tenant 106 crosses the threshold or not. The overall policy score crosses the threshold when a policy or multiple tenant policies are violated by the cellular devices 108 of the tenant 106 and threat flags are raised. If threshold is not crossed, the threat detector 204 of the threat management module 110 keeps on monitoring the threat landscape.

On the other hand, if the overall policy score crosses the threshold, the recommendation engine 214 generates policy recommendations based on the best practices done network-wide to remediate the threat, at block 912. For this purpose, the recommendation engine 214 loads the threat information, policy profiles, and generally implemented remediation actions from the meta database 212 to make an intelligent decision.

At block 914, the dynamic security system 100 gets feedback from the user to check the impact of the recommendations provided by the recommendation engine 214. Finally, at block 916, the threat management module 110 trains the machine learning module 208 based on the feedback from the user to enhance network security.

Figure 10:
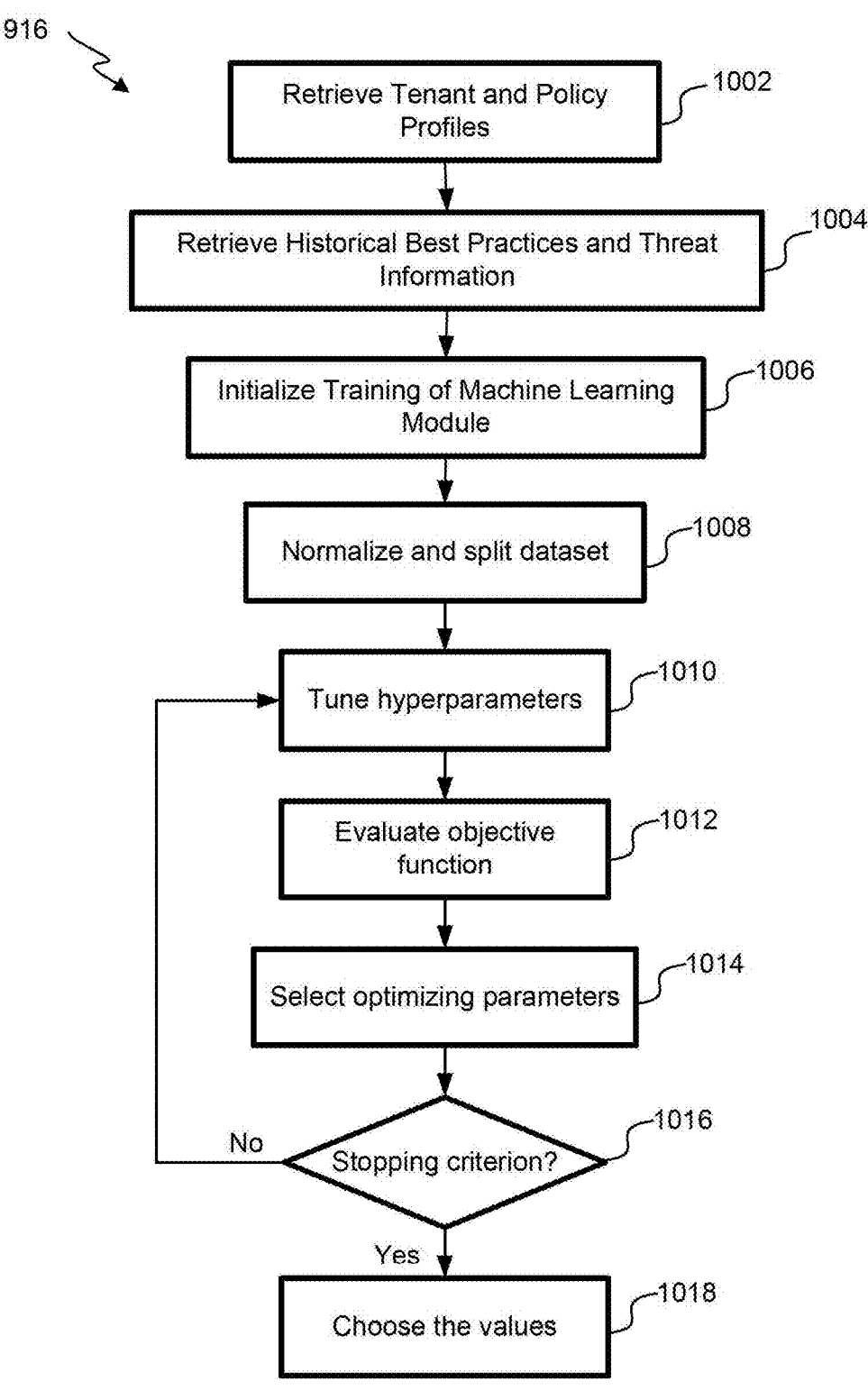
FIG. 10 illustrates a flowchart for training of a machine learning module for policy generation and recommendation at the dynamic security system as an embodiment.

Referring next to FIG. 10, a training mechanism of the block 916 of the machine learning module 208 for policy generation and recommendation at the dynamic security system 100 as an embodiment is shown. At block 1002, the machine learning module 208 retrieves the tenant and policy profiles from the meta database 212. At block 1004, the machine learning module 208 retrieves the historical best practices and the threat information from the meta database 212.

At block 1006, the threat management module 110 then initializes the machine learning module 208 for training. The machine learning module 208 can be any machine learning algorithm designed to recognize patterns like random forest algorithms, k-means clustering, neural networks etc.

At block 1008, the machine learning module 208 functions by normalizing the variables and splitting a dataset. The dataset is typically divided into two or more subsets: a training set and a validation set. The training set is used to train the machine learning module 208 while the validation set helps in model selection and hyperparameter tuning. The machine learning modules 208 often have hyperparameters that are tuned to optimize performance. At block 1010, the hyperparameters are tuned for optimized performance. Note that the hyperparameters are not learned from the data but are set before training. Techniques like grid search, random search, or Bayesian optimization are used to find the optimal combination of hyperparameters.

At block 1012, the machine learning module 208 learns to capture patterns and relationships in the dataset while training by adjusting and optimizing its internal parameters. This is often an iterative process and various optimization algorithms are used to update model parameters. The machine learning module 208 has an objective function, which depends on the specific problem and the goals of the optimization task. The objective function typically takes one or more parameters or variables as input and produces a scalar value as output.

At block 1014, the optimization process finds the parameters or configurations that minimize or maximize the value of the objective function. Various optimization algorithms are used to iteratively adjust the parameters to improve the performance of the machine learning model. These algorithms can include gradient descent, stochastic gradient descent (SGD), genetic algorithms, or Bayesian optimization.

At block 1016, the machine learning module 208 is run in loops to check if the desired stopping criterion has been met or not. This is done by tuning hyperparameters, evaluating objective function, and optimizing parameters until a specified stopping criterion is achieved. The objective function is often evaluated using the training dataset, which includes input data and their corresponding ground truth or target values. At block 1018, the values are chosen at which the stopping criterion is met.

Referring next to FIG. 11, a flowchart for policy recommendation with a continuous update 1100 in policies at the cellular devices 108 of the dynamic security system 100 as an embodiment is shown. At block 1104, the policy analyzer 210 updates the policy profile of a user stored in the meta database 212 based on user's recent choices. At block 1106, the machine learning module 208 loads threat information from the meta database 212.

At block 1108, the threat management module 110 retrains the machine learning module 208 according to the latest policy profiles, threat information, and the user's preferences. At block 1110, the threat management module 110 again checks if any of the policies have been updated or not. If no policy is updated, the recommendation engine 214 provides no new policy recommendations at the cellular device 108 and hence the process is ended at block 1112.

However, if the policy is updated by the tenant 106 or the enterprise 114, the recommendation engine 214 generates policy recommendations to remediate threats and to provide network security. The recommendation engine 214 considers the overall policy score with respect to a tenant profile and recommends policies if the policy score is below certain level or not at per with the overall policy score of similar tenant profile. The overall policy score for the tenant 106 indicates the violation of tenant policies, risk score, and threat flags raised at the cellular device 108.

Finally, at block 1116, the dynamic security system 100 gets feedback on the impact of the recommended actions from the user. This feedback is then used to update policy profiles and retrain the machine learning module 208 to keep in-line with the current policies being used at the cellular network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A dynamic security system to secure a plurality of cellular devices across a cellular network in a cloud-based environment, the dynamic security system comprises:
   - a tenant of a plurality of tenants using a plurality of cellular networks, the tenant includes the plurality of cellular devices;
   - a tunnel between a cellular device of the plurality of cellular devices and the cellular network, the tunnel is operable to:
     - transmit traffic from the cellular device of the plurality of cellular devices at the cellular network; and
     - identify traffic associated with a plurality of network identifiers;
   - a traffic steering module to route traffic towards a gateway of a plurality of gateways in the cloud-based environment; and
   - a threat management module to analyze traffic at the tunnel and to generate a plurality of policies and a plurality of recommendations or remediation actions to remediate a threat, the threat management module is operable to:
     - intercept traffic within the tunnel at an application layer of the cloud-based environment;
     - create a plurality of policy profiles for the plurality of tenants at the cellular network;
     - monitor a threat landscape of the cellular network and correlate the threat with the plurality of policy profiles;
     - store a plurality of tenant profiles, a plurality of threat information, and the plurality of policy profiles; and
     - based on the plurality of tenant profiles, the plurality of policy profiles, geo-location of the cellular device, and historical data of the plurality of policies, generate the plurality of recommendations or remediation actions and provide the plurality of recommendations or remediation actions at the cellular device to remediate the threat, wherein the plurality of recommendations or remediation actions are provided as options in a prioritized sequence, with top options being emphasized for user selection.

2. The dynamic security system of claim 1, wherein the plurality of recommendations is based on a plurality of updated policies, the plurality of policy profiles, and a plurality of user preferences.

3. The dynamic security system of claim 1, wherein a custom network identifier is used for traffic segregation in the cellular network to provide clientless security and the custom network identifier is an access point name (APN) for a 4G network and a data network name (DNN) for a 5G network.

4. The dynamic security system of claim 1, wherein the plurality of policies defines a plurality of inline security functions and access controls based on the tenant and a device identity.

5. The dynamic security system of claim 1, wherein the threat management module auto-applies a recommendation of the plurality of recommendations at the cellular device when a user of the cellular device is not selecting the recommendation of the plurality of recommendations.

6. The dynamic security system of claim 1, wherein feedback from a user of the cellular device and an update in a policy of the plurality of policies are used to train a machine learning module of the threat management module.

7. The dynamic security system of claim 1, wherein remediation in case of detection of violation of a policy of the plurality of policies includes:
   - blocking a corresponding traffic;
   - quarantining the cellular device of the plurality of cellular devices; and
   - allowing limited connectivity to the cellular device of the plurality of cellular devices.

8. A dynamic security method for securing a plurality of cellular devices across a cellular network in a cloud-based environment, the dynamic security method comprises:
   - transmitting traffic from a cellular device of the plurality of cellular devices at the cellular network via a tunnel;
   - identifying traffic associated with a plurality of network identifiers;
   - routing traffic towards a gateway of a plurality of gateways in the cloud-based environment; and
   - analyzing traffic at the tunnel and generating a plurality of policies and a plurality of recommendations or remediation actions to remediate a threat via a threat management module, the threat management module is operable to:
     - intercept traffic within the tunnel at an application layer of the cloud-based environment;
     - create a plurality of policy profiles for a plurality of tenants at the cellular network;
     - monitor a threat landscape of the cellular network and relating the threat with the plurality of policy profiles;
     - store a plurality of tenant profiles, a plurality of threat information, and the plurality of policy profiles; and
     - based on the plurality of tenant profiles, the plurality of policy profiles, geo-location of the cellular device, and historical data of the plurality of policies, generate the plurality of recommendations or remediation actions and provide the plurality of recommendations or remediation actions at the cellular device to remediate the threat, wherein the plurality of recommendations or remediation actions are provided as options in a prioritized sequence, with top options being emphasized for user selection.

9. The dynamic security method of claim 8, wherein the plurality of recommendations is based on a plurality of updated policies, the plurality of policy profiles, and a plurality of user preferences.

10. The dynamic security method of claim 8, wherein a custom network identifier is used for traffic segregation in the cellular network to provide clientless security and the custom network identifier is an access point name (APN) for a 4G network and a data network name (DNN) for a 5G network.

11. The dynamic security method of claim 8, wherein the plurality of policies defines a plurality of inline security functions and access controls based on a tenant and a device identity.

12. The dynamic security method of claim 8, wherein the threat management module auto-applies a recommendation of the plurality of recommendations at the cellular device when a user of the cellular device is not selecting the recommendation of the plurality of recommendations.

13. The dynamic security method of claim 8, wherein feedback from a user of the cellular device and an update in a policy of the plurality of policies are used to train a machine learning module of the threat management module.

14. The dynamic security method of claim 8, wherein remediation in case of detection of violation of a policy of the plurality of policies includes:

blocking a corresponding traffic;

quarantining the cellular device of the plurality of cellular devices; and allowing limited connectivity to the cellular device of the plurality of cellular devices.

15. A non-transitory computer-readable storage medium having computer-executable instructions embodied thereon that, when executed by one or more processors, facilitate a dynamic security method for securing a plurality of cellular devices across a cellular network in a cloud-based environment, the non-transitory computer-readable storage medium comprises:

transmitting traffic from a cellular device of the plurality of cellular devices at the cellular network via a tunnel;

identifying traffic associated with a plurality of network identifiers;

routing traffic towards a gateway of a plurality of gateways in the cloud-based environment; and analyzing traffic at the tunnel and generating a plurality of policies and a plurality of recommendations or remediation actions to remediate a threat via a threat management module, the threat management module is operable to:

intercept traffic within the tunnel at an application layer of the cloud-based environment;

create a plurality of policy profiles for a plurality of tenants at the cellular network;

monitor a threat landscape of the cellular network and relating the threat with the plurality of policy profiles;

store a plurality of tenant profiles, a plurality of threat information, and the plurality of policy profiles; and based on the plurality of tenant profiles, the plurality of policy profiles, geo-location of the cellular device, and historical data of the plurality of policies, generate the plurality of recommendations or remediation actions and provide the plurality of recommendations or remediation actions at the cellular device to remediate the threat, wherein the plurality of recommendations or remediation actions are provided as options in a prioritized sequence, with top options of the prioritized sequence being emphasized for user selection.

16. The computer-readable media of claim 15, wherein the plurality of recommendations is based on a plurality of updated policies, the plurality of policy profiles, and a plurality of user preferences.

17. The computer-readable media of claim 15, wherein a custom network identifier is used for traffic segregation in the cellular network to provide clientless security and the custom network identifier is an access point name (APN) for a 4G network and a data network name (DNN) for a 5G network.

18. The computer-readable media of claim 15, wherein the plurality of policies defines a plurality of inline security functions and access controls based on a tenant and a device identity.

19. The computer-readable media of claim 15, wherein the threat management module auto-applies a recommendation of the plurality of recommendations at the cellular device when a user of the cellular device is not selecting the recommendation of the plurality of recommendations.

20. The computer-readable media of claim 15, wherein feedback from a user of the cellular device and an update in a policy of the plurality of policies are used to train a machine learning module of the threat management module.

* * * * *